(12) United States Patent
Jikihara et al.

(10) Patent No.: US 8,827,578 B2
(45) Date of Patent: Sep. 9, 2014

(54) DOME CAMERA

(75) Inventors: Yuuya Jikihara, Fukuoka (JP); Jyouji Wada, Kanagawa (JP); Masahito Oka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/882,863

(22) PCT Filed: Nov. 9, 2011

(86) PCT No.: PCT/JP2011/006262
§ 371 (c)(1),
(2), (4) Date: May 1, 2013

(87) PCT Pub. No.: WO2012/063482
PCT Pub. Date: May 18, 2012

(65) Prior Publication Data
US 2013/0223834 A1    Aug. 29, 2013

(30) Foreign Application Priority Data

Nov. 10, 2010  (JP) ................. 2010-251437

(51) Int. Cl.
*G03B 17/00* (2006.01)
*G03B 11/04* (2006.01)
*G03B 17/02* (2006.01)
*G03B 11/00* (2006.01)
*G08B 13/196* (2006.01)

(52) U.S. Cl.
CPC .......... *G03B 11/045* (2013.01); *G08B 13/1963* (2013.01); *G03B 17/02* (2013.01); *G03B 11/00* (2013.01)
USPC ....................................... 396/448

(58) Field of Classification Search
CPC ................................................... G03B 11/04
USPC ......................................................... 396/448
See application file for complete search history.

(56) References Cited

U.S. PATENT DOCUMENTS 3,819,856 A   6/1974   Pearl et al.
4,833,534 A   5/1989   Paff et al.
(Continued)

FOREIGN PATENT DOCUMENTS

JP    10-327337     12/1998
JP    2001-199492    7/2001
(Continued)

OTHER PUBLICATIONS

Search report from E.P.O., mail date is Dec. 4, 2013.
(Continued)

*Primary Examiner* — Clayton E LaBalle
*Assistant Examiner* — Dennis Hancock
(74) *Attorney, Agent, or Firm* — Greenblum & Bernstein, P.L.C.

(57) ABSTRACT

A dome camera includes a camera lens capable of rotating in a tilt direction, and a dome cover for covering the camera lens. A tilt rotation axis of the camera lens is positioned more in a zenith direction than a center of the dome cover, and a polarizing filter or a partially darkening filter is inserted on an optical axis of the camera lens as a tilt angle of the camera lens becomes larger than a predetermined threshold angle. According to this dome camera, both securing of a wide field of view and reduction in the image quality deterioration may be achieved when capturing an image in a direction at a large tilt angle (a direction near the horizontal direction).

16 Claims, 15 Drawing Sheets

(56) References Cited

U.S. PATENT DOCUMENTS

| | | | |
|---|---|---|---|
| 2004/0075739 A1* | 4/2004 | Wada | 348/143 |
| 2008/0231699 A1 | 9/2008 | Konishi et al. | |
| 2009/0310956 A1 | 12/2009 | Takada et al. | |
| 2010/0110192 A1* | 5/2010 | Johnston et al. | 348/148 |
| 2011/0096164 A1 | 4/2011 | Mori et al. | |
| 2012/0086849 A1* | 4/2012 | Wada et al. | 348/344 |

FOREIGN PATENT DOCUMENTS

| | | |
|---|---|---|
| JP | 2004-104242 | 4/2004 |
| JP | 2005-084605 | 3/2005 |
| JP | 2005-221637 | 8/2005 |
| JP | 2005-250276 | 9/2005 |
| JP | 2005-300659 | 10/2005 |
| JP | 2006-117107 | 5/2006 |
| JP | 2006-325070 | 11/2006 |
| JP | 2007-160734 | 6/2007 |
| JP | 2007-056565 | 10/2007 |
| JP | 2008-046493 | 2/2008 |
| JP | 2010-107772 | 5/2010 |
| JP | 2010-145704 | 7/2010 |
| JP | 2010-177869 | 8/2010 |
| JP | 2010-283598 | 12/2010 |
| KR | 10-0847088 | 7/2008 |
| WO | 2010/029727 | 3/2010 |

OTHER PUBLICATIONS

International Search Report, mail date is Dec. 13, 2011.
English translation of International Preliminary Report on Patentability, mail date is May 23, 2013.
Japan Office action, mail date is Sep. 3, 2013.
Japan(JP Appl. No. 2013-214660) Office action, mail date is Jul. 8, 2014.
Japan(JP Appl. No. 2013-214642) Office action, mail date is Jul. 8, 2014.

* cited by examiner

DOME CAMERA

TECHNICAL FIELD

The present invention relates to a dome camera including a dome cover for covering a camera lens.

BACKGROUND ART

A dome camera is used as a surveillance camera or the like. In such a surveillance camera, a camera lens is covered by a dome cover, and the camera lens is protected by the dome cover. Also, a general surveillance camera includes a pan tilt function (a function of rotating a camera lens in a pan direction and a tilt direction) and a zoom function.

A conventional dome camera includes a hemispherical dome cover, and the center of rotation of a camera lens is arranged to be on the optical axis and to coincide with the center of the dome cover. It is known that a good image is obtained according to this arrangement.

However, according to the arrangement of the camera lens as described above, when capturing an image in a direction at a large tilt angle (a direction near the horizontal direction), vignetting occurs, and a good image is not obtained. Accordingly, a technique of offsetting the camera lens from the center of the dome cover in a zenith direction is conventionally proposed (for example, see Patent Literatures 1 and 2).

By offsetting the camera lens in the zenith direction of the dome cover, capturing of an image in a direction at a large tilt angle (a direction near the horizontal direction) is enabled without the vignetting occurring.

However, with a conventional dome camera, since the camera lens is offset from the center of the dome cover, aberration due to a lens effect of the dome cover occurs, and the image quality is deteriorated due to this aberration. That is, in the case of capturing an image in a direction at a large tilt angle (a direction near the horizontal direction), securing of a wide field of view and reduction in the image quality deterioration are in the relationship of tradeoff, and it is extremely difficult to achieve both of the two.

CITATION LIST

Patent Literature

Patent Literature 1: Japanese Patent Application Laid-Open No. 2005-300659
Patent Literature 2: Japanese Patent Application Laid-Open No. 2005-221637

SUMMARY OF INVENTION

Technical Problem

The present invention is made in view of the background described above. The object of the present invention is to provide a dome camera capable of achieving both securing of a wide field of view and reduction in the image quality deterioration in a case of capturing an image in a direction at a large tilt angle (a direction near the horizontal direction).

Solution to Problem

One mode of the present invention is a dome camera, and this dome camera includes a camera lens capable of rotating in a tilt direction, a dome cover for covering the camera lens, and filter insertion means for inserting a polarizing filter or a partially darkening filter on an optical axis of the camera lens as a tilt angle of the camera lens whose tilt rotation axis is positioned more in a zenith direction than a center position of the dome cover becomes larger than a predetermined threshold angle.

As will be described below, the present invention includes other modes. Thus, the disclosure of the invention intends to provide some modes of the present invention, and does not intend to limit the scope of the invention described and claimed herein.

DESCRIPTION OF EMBODIMENTS

Figure 1:
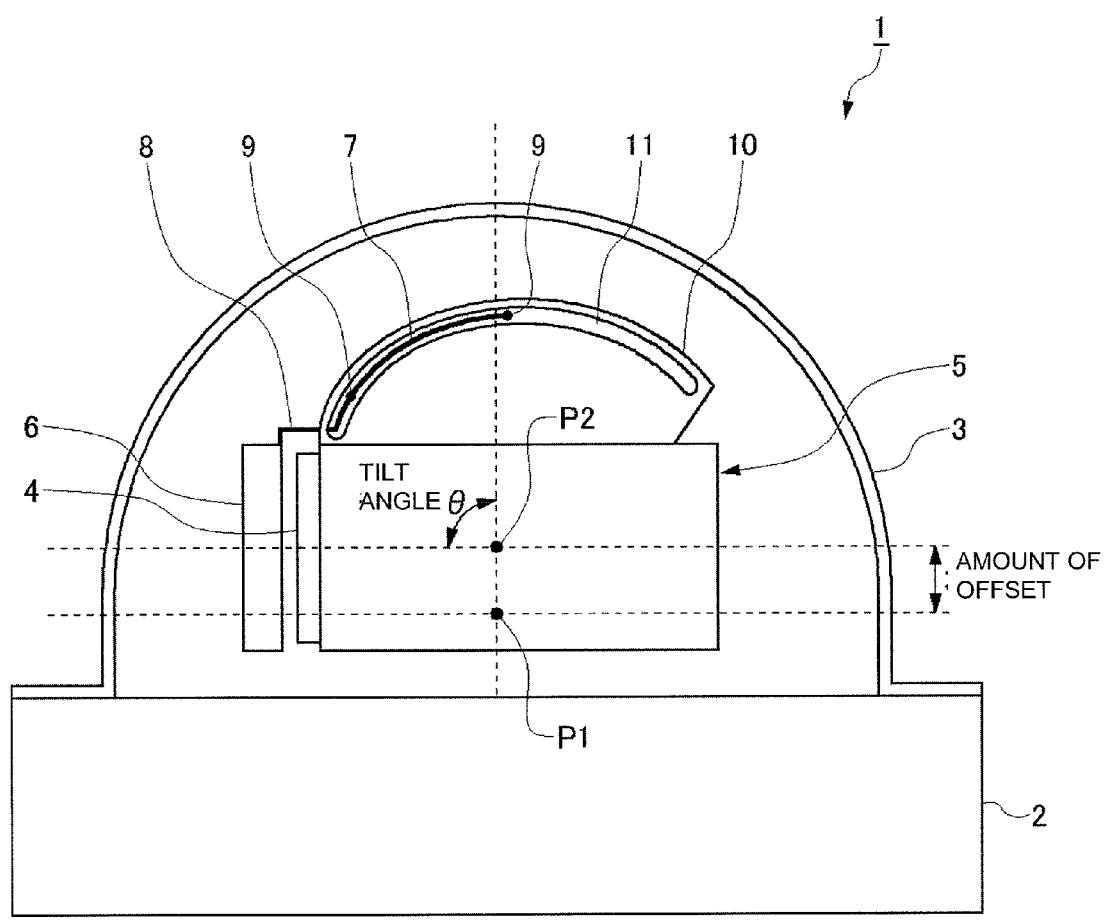
FIG. 1 is an explanatory diagram of a dome camera according to a first embodiment (tilt angle: large).

A detailed description of the present invention is given below. However, the detailed description and the appended drawings are not to limit the invention.

A dome camera of the present invention is configured to include a camera lens capable of rotating in a tilt direction, a dome cover for covering the camera lens, and filter insertion means for inserting a polarizing filter or a partially darkening filter on an optical axis of the camera lens as a tilt angle of the camera lens whose tilt rotation axis is positioned more in a zenith direction than a center position of the dome cover becomes larger than a predetermined threshold angle.

According to this configuration, when the tilt angle of the camera lens becomes large, a polarizing filter or a partially darkening filter (a darkening filter by which incident light is partially blocked) is inserted on the optical axis of the camera lens. With the polarizing filter or the partially darkening filter, the image quality may be prevented from deteriorating due to offsetting of the camera lens. Accordingly, securing of a wide field of view and reduction in the image quality deterioration may both be achieved in the case of capturing an image in a direction at a large tilt angle (a direction near the horizontal direction).

Also, according to the dome camera of the present invention, the partially darkening filter may include a blocking area that blocks half of a field of view of the camera lens, and the blocking area may be set across half a range on an opposite side of the zenith direction of the dome cover.

According to this configuration, in the case of capturing an image in a direction at a large tilt angle (a direction near the horizontal direction), light is blocked by the blocking area of the partially darkening filter on half the range on the opposite side of the zenith direction of the dome cover. The range where light is blocked is assumed to correspond to a part where the molding precision of the dome cover is not very high and which causes deterioration of the image quality. By blocking light at this part, deterioration of the image quality can be suppressed.

Also, according to the dome camera of the present invention, the camera lens may include a zoom function, and when a zoom factor of the camera lens is within a range of factors on a TELE-end side greater than a predetermined threshold factor, the filter insertion means may insert the polarizing filter or the partially darkening filter on the optical axis of the camera lens.

According to this configuration, when the zoom factor of the camera lens is set on the TELE-end side, the polarizing filter or the partially darkening filter is inserted on the optical axis of the camera lens, and the image quality may be prevented, by the polarizing filter or the partially darkening filter, from deteriorating due to the offset of the camera lens. Additionally, when the zoom factor of the camera lens is set on a WIDE-end side, the image quality is not so deteriorated, and in this case, the polarizing filter or the partially darkening filter does not have to be inserted regardless of the tilt angle of the camera lens.

Furthermore, according to the dome camera of the present invention, the polarizing filter or the partially darkening filter may be inserted in front of the camera lens.

According to this configuration, the polarizing filter or the partially darkening filter is inserted in front of the camera lens, and light before entering the camera lens is polarized by the polarizing lens or is partially blocked by the partially darkening filter. That is, light which has been polarized by the polarizing lens or light which has been partially blocked by the partially darkening filter enters the camera lens. Deterioration of the image quality due to the offset of the camera lens may thereby be suppressed.

Moreover, according to the dome camera of the present invention, the polarizing filter may be inserted in front of an image sensor using switching means for an infrared cut filter and an optical glass.

According to this configuration, the polarizing filter may be inserted using the switching means for an infrared cut filter and an optical glass. By using a mechanism already provided (the switching mechanism for an infrared cut filter and an optical glass), the number of parts may be reduced compared to a case of separately providing a dedicated mechanism, and the manufacturing cost may be reduced and miniaturization is enabled.

According to the present invention, in the case of capturing an image in a direction at a large tilt angle (a direction near the horizontal direction), both securing of a wide field of view and reduction in the image quality deterioration may be achieved.

Hereinafter, the dome camera of an embodiment of the present invention will be described with reference to the drawings. In the present embodiment, a case of a dome camera which is used as a surveillance camera or the like is illustrated.

(First Embodiment)

Figure 2:
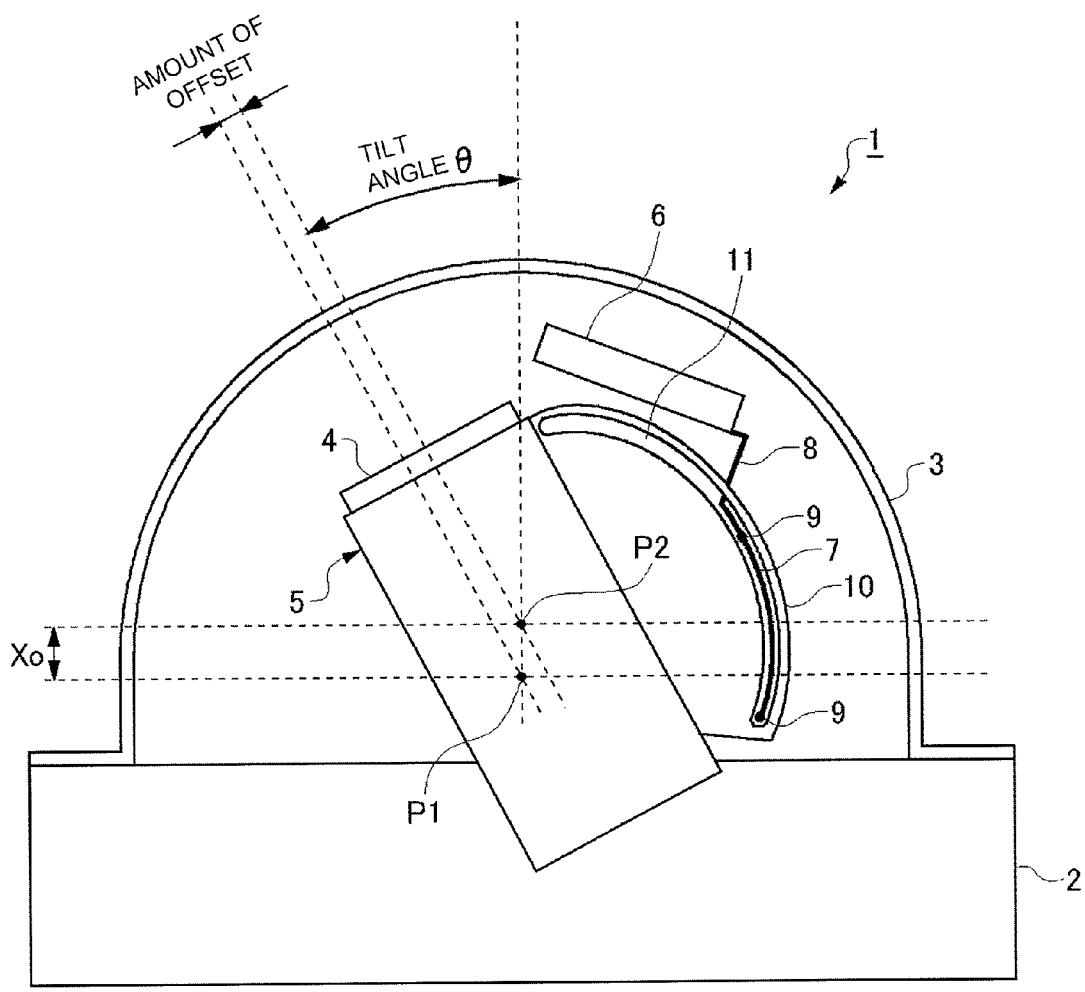
FIG. 2 is an explanatory diagram of the dome camera according to the first embodiment (tilt angle: small).
Figure 3:
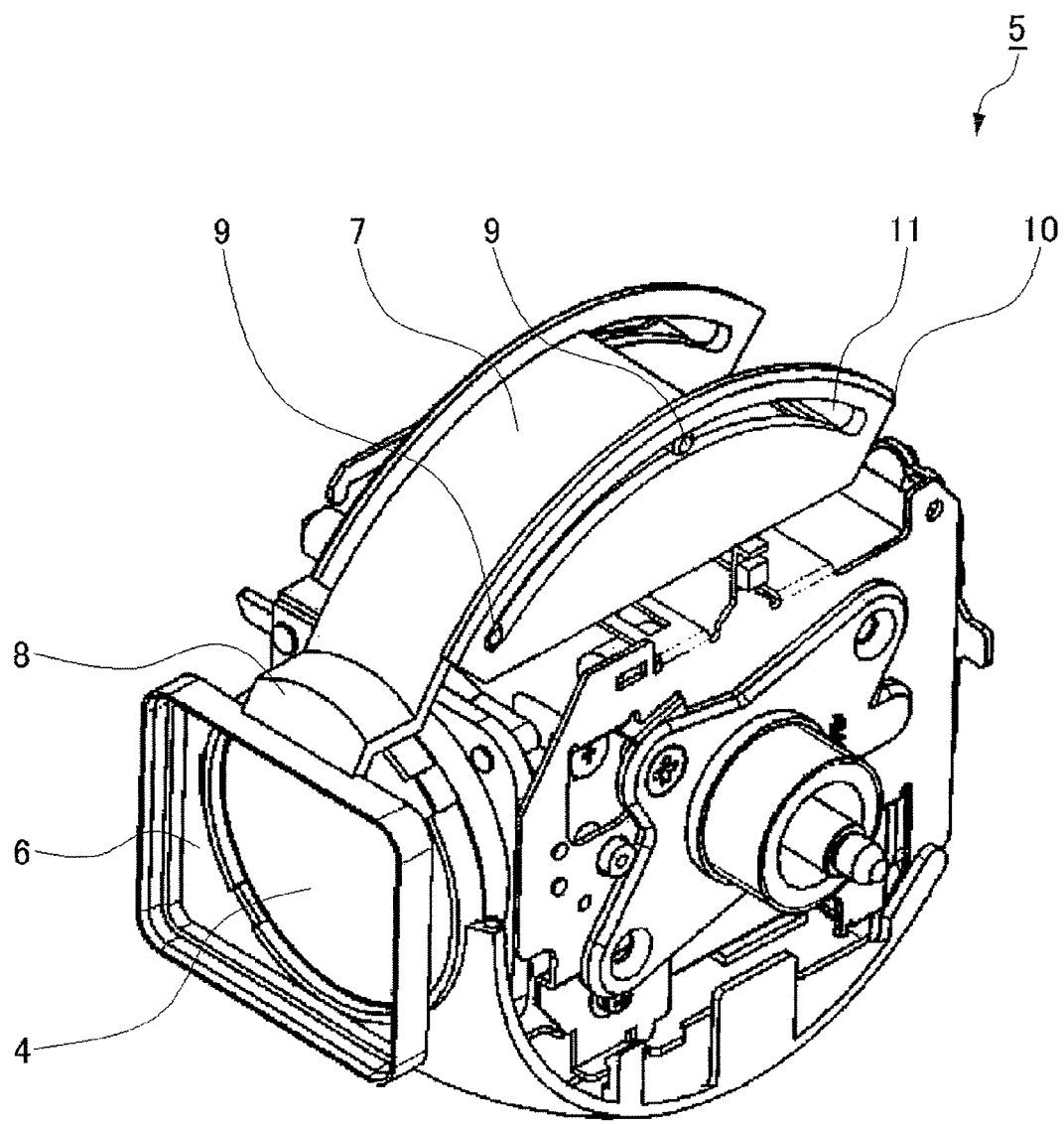
FIG. 3 is a perspective view of a lens unit according to the first embodiment (polarizing filter: inserted position).
Figure 4:
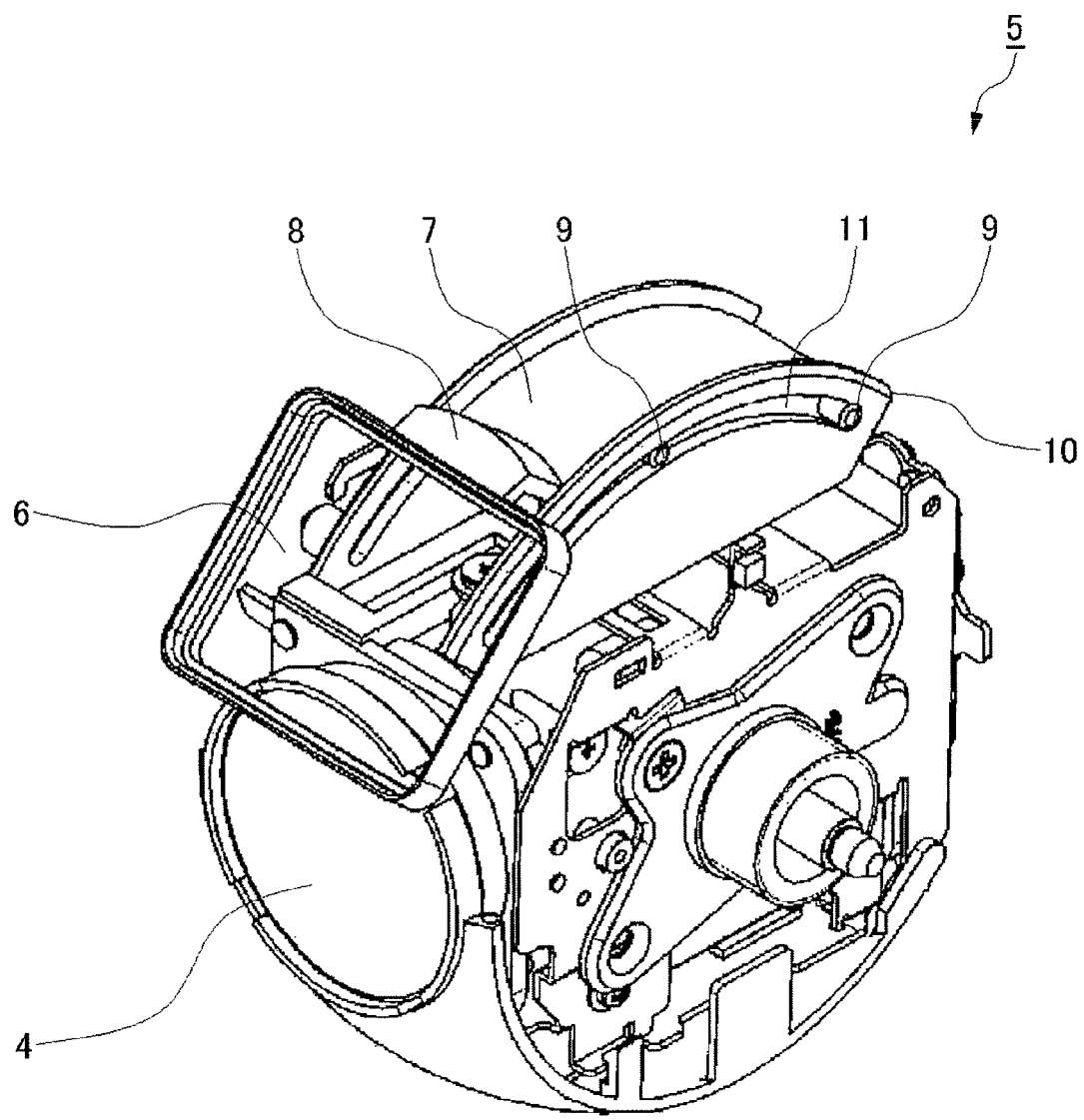
FIG. 4 is a perspective view of the lens unit according to the first embodiment (polarizing filter: retracted position).

A configuration of a dome camera of a first embodiment of the present invention will be described with reference to the drawings. FIGS. 1 and 2 are explanatory diagrams of the dome camera of the present embodiment. FIGS. 3 and 4 are perspective views of a lens unit of the dome camera of the present embodiment.

As shown in FIGS. 1 and 2, a dome camera 1 includes a base 2 to be attached to a ceiling, a wall or the like, and a dome cover 3 to be attached to the base 2. A lens unit 5 including a camera lens 4 is provided inside the dome cover 3. The lens unit 5 is accommodated inside a housing configured from the base 2 and the dome cover 3, and the camera lens 4 is covered by the dome cover 3. This camera lens 4 includes a zoom function.

A pan motor and a tilt motor are provided to the dome camera 1, and the lens unit 5 (the camera lens 4) is capable of rotating in a pan direction and a tilt direction by the driving forces of the pan motor and the tilt motor. The operation of these motors (the pan motor, the tilt motor) is controlled by a control unit such as a microcomputer.

As shown in FIGS. 3 and 4, a polarizing filter 6 is provided to the lens unit 5. The polarizing direction of the polarizing filter 6 is a vertical direction (a height direction) or a horizontal direction (a lateral direction). A support member 8 having an arc-shaped guide portion 7 extends from an upper portion of the polarizing filter 6. Two guide pins 9 are provided in a protruding manner on each of the left and right sides of the arc-shaped guide portion 7. A left and right pair of guide plates 10 is provided at an upper portion of the lens unit 5. The guide portion 7 of the support member 8 is sandwiched by the left and right pair of guide plates 10, and the guide pins 9 are inserted, in a slidable manner, in an arc-shaped slot 11 provided to the guide plates 10.

Then, when the guide pins 9 slide in the slot 11 of the guide plates 10, the polarizing filter 6 moves in a reciprocating manner between an inserted position (a position of the polarizing filter 6 inserted in front of the camera lens 4, as shown in FIG. 3) and a retracted position (a position of the polarizing filter 6 retracted from in front of the camera lens 4, as shown in FIG. 4). A motor for a filter is provided to the dome camera 1, and the polarizing filter 6 is enabled to move between the inserted position and the retracted position by the driving force of the motor for a filter. The operation of the motor for a filter is also controlled by a control unit such as a microcomputer.

Figure 5:
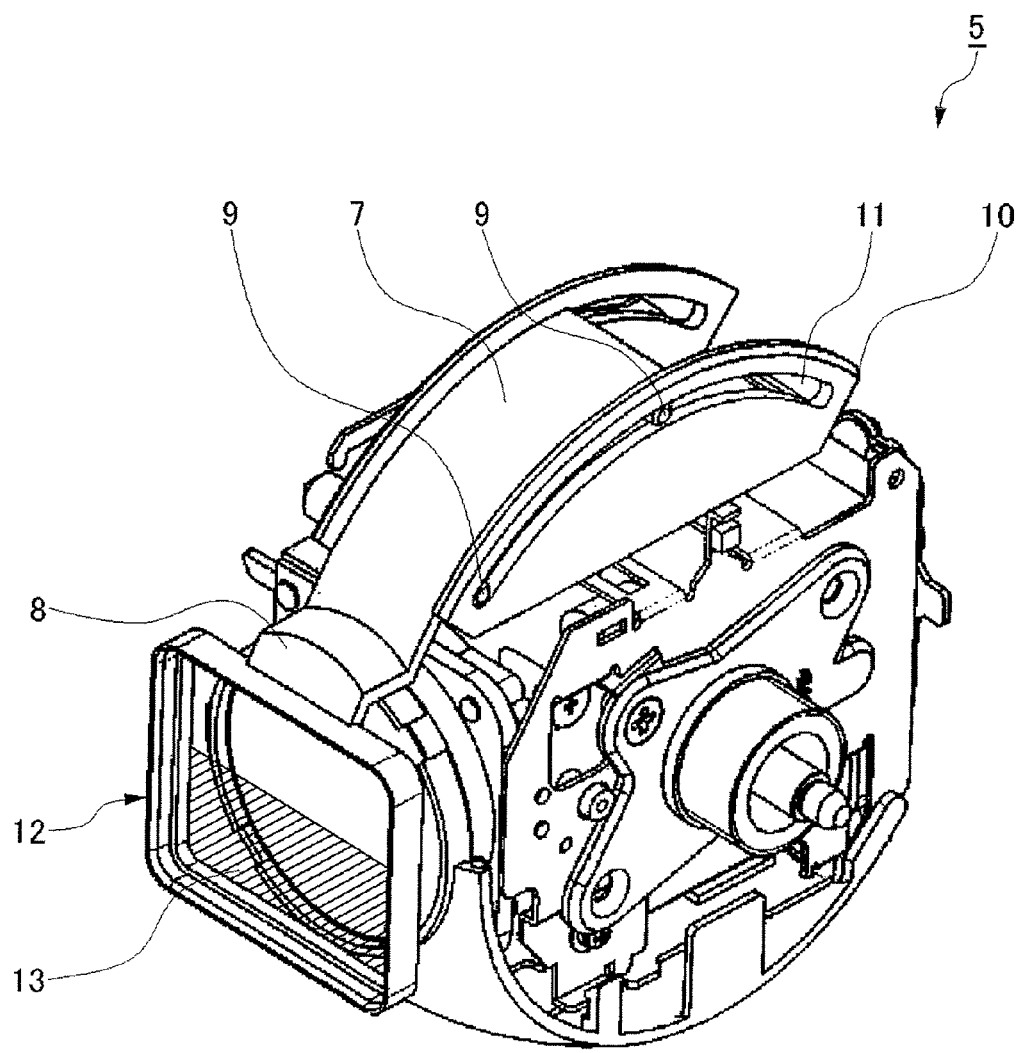
FIG. 5 is a perspective view of a lens unit according to a modified example of the first embodiment (darkening filter: inserted position).

A modified example of the lens unit 5 of the present embodiment is shown in FIG. 5. In this modified example, a partially darkening filter 12 is used instead of the polarizing filter 6. The partially darkening filter 12 is a darkening filter that partially blocks incident light. In this case, as shown in FIG. 5, the partially darkening filter 12 has a blocking area 13 that blocks half of the field of view of the camera lens 4. This blocking area 13 is set across half the range on the opposite side of the zenith direction of the dome cover 3 (the lower side in FIG. 5).

Next, an operation of the dome camera 1 of the first embodiment configured in the above manner will be described with reference to the drawings.

Figure 6:
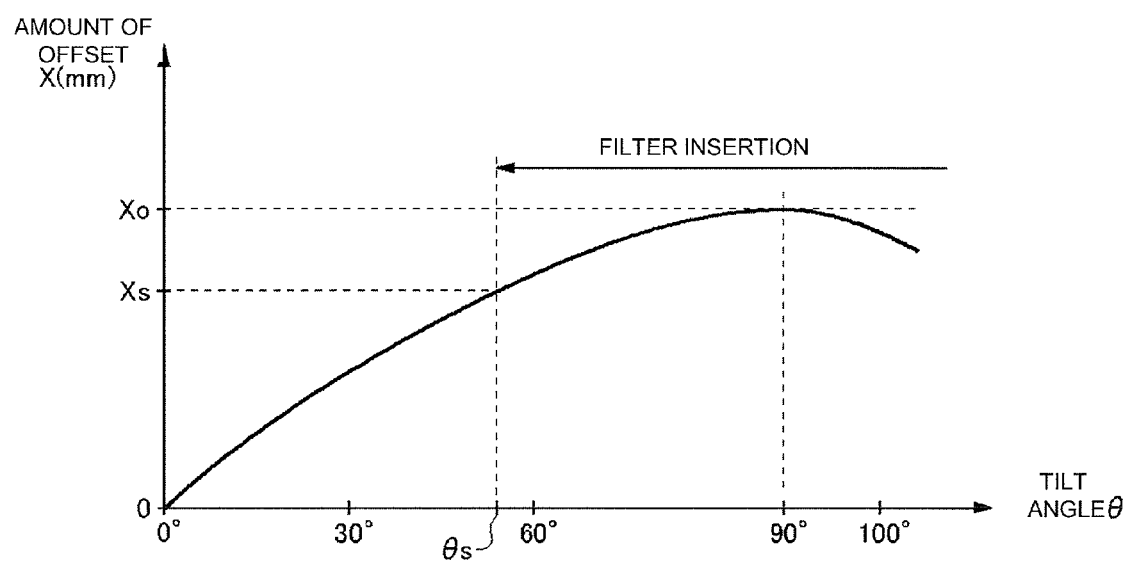
FIG. 6 is a diagram of relationships of a tilt angle to the amount of offset and insertion/non-insertion of a filter according to the first embodiment.

FIG. 6 is a diagram showing, with respect to the dome camera 1 of the present embodiment, a relationship between a tilt angle and the amount of offset and a relationship between the tilt angle and insertion/non-insertion of a filter.

Here, the zenith direction of the dome cover 3 serves as the reference for the tilt angle of the camera lens 4. That is, when the camera lens 4 faces the zenith direction of the dome cover 3, the tilt angle is 0 degrees, and when the camera lens 4 faces the horizontal direction, the tilt angle is 90 degrees. Accordingly, the tilt angle becomes smaller as the camera lens 4 is moved toward the zenith direction of the dome cover 3, and the tilt angle becomes larger as the camera lens 4 is moved from the zenith direction toward the horizontal direction.

In this case, the amount of offset x is dependent on a tilt angle θ. When the amount of shift between a center P1 of the dome cover 3 and a tilt rotation axis P2 is given as x0, the amount of offset x is given by the formula below (see FIGS. 2 and 6).

$$x = x0 \times \sin\theta$$

Additionally, here, a case is described where the amount of offset x is dependent on the tilt angle θ, as shown in FIG. 6, but the scope of the present invention is not limited to such, and the amount of offset may be changed by moving the tilt rotation axis P2 in the zenith direction when the tilt angle becomes greater than 75 degrees, for example.

Furthermore, in the present embodiment, when the tilt angle of the camera lens 4 is in a range of 0° to θs, the polarizing filter 6 is not inserted (the polarizing filter 6 stays at the retracted position). When the tilt angle of the camera lens 4 exceeds θs, the polarizing filter 6 is inserted (the polarizing filter 6 moves to the inserted position). Here, the tilt angle θs corresponds to the threshold angle of the present invention. Additionally, the threshold angle θs may be set to any value according to the use, installation environment of the like of the dome camera.

Figure 7:
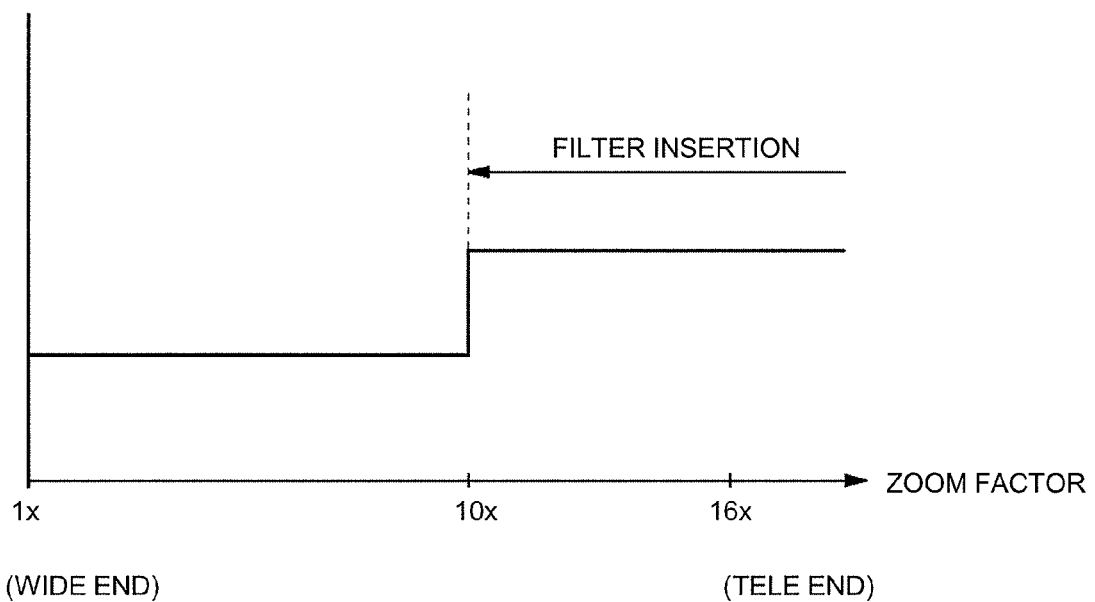
FIG. 7 is a diagram of a relationship between a zoom factor and insertion/non-insertion of a filter according to the first embodiment.

FIG. 7 is a diagram showing, with respect to the dome camera 1 of the present embodiment, a relationship between a zoom factor and insertion/non-insertion of a filter. As shown in FIG. 7, when the zoom factor is within a range of 1× to 10× (a range on a WIDE-end side), the polarizing filter 6 is not inserted (the polarizing filter 6 stays at the retracted position). When the zoom factor enters a range over 10× (a range on a TELE-end side), the polarizing filter 6 is inserted (the polarizing filter 6 is moved to the inserted position). Here, the zoom factor of 10× corresponds to the threshold factor of the present invention.

Additionally, the polarizing filter 6 is inserted when the tilt angle is within a large tilt angle range (a range exceeding 75 degrees) and the zoom factor is within the range on the TELE-end side (the range exceeding 10×). That is, even if the tilt angle is within the large tilt angle range (for example, when the tilt angle is 90 degrees), if the zoom factor is within the range on the WIDE-end side, the polarizing filter 6 is not inserted.

Figure 8:
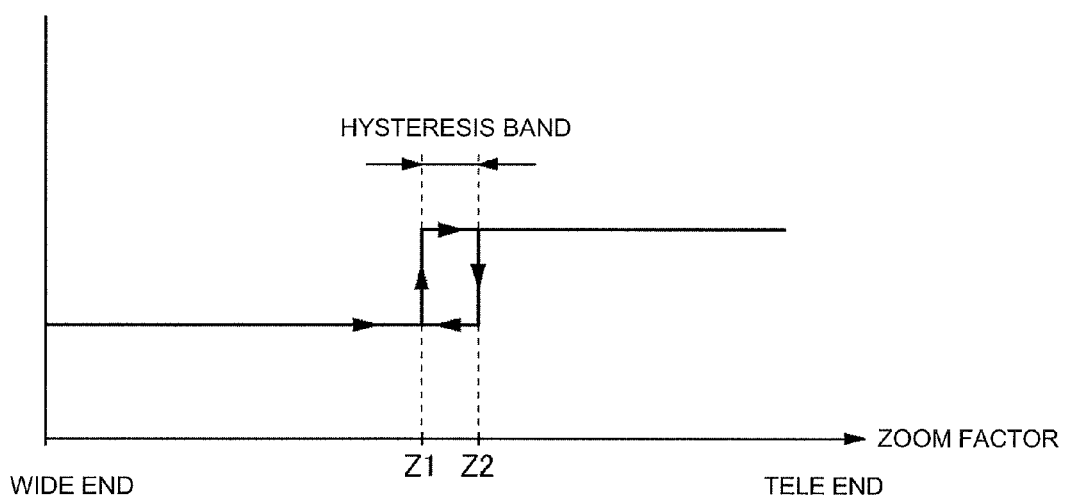
FIG. 8 is a diagram of a relationship between a zoom factor and insertion/non-insertion of a filter according to a modified example of the first embodiment.

FIG. 8 shows a modified example of control of filter insertion with respect to the zoom factor. As shown in FIG. 8, control of filter insertion may be performed with a predetermined hysteresis band. For example, when the zoom factor changes from a small value (a value near the WIDE end) to a large value (a value near the TELE end), the polarizing filter 6 may be inserted at a first threshold factor z1, and when the zoom factor changes from a large value (a value near the TELE end) to a small value (a value near the TELE end), the polarizing filter 6 may be retracted at a second threshold factor z2 (z1<z2).

Figure 9:
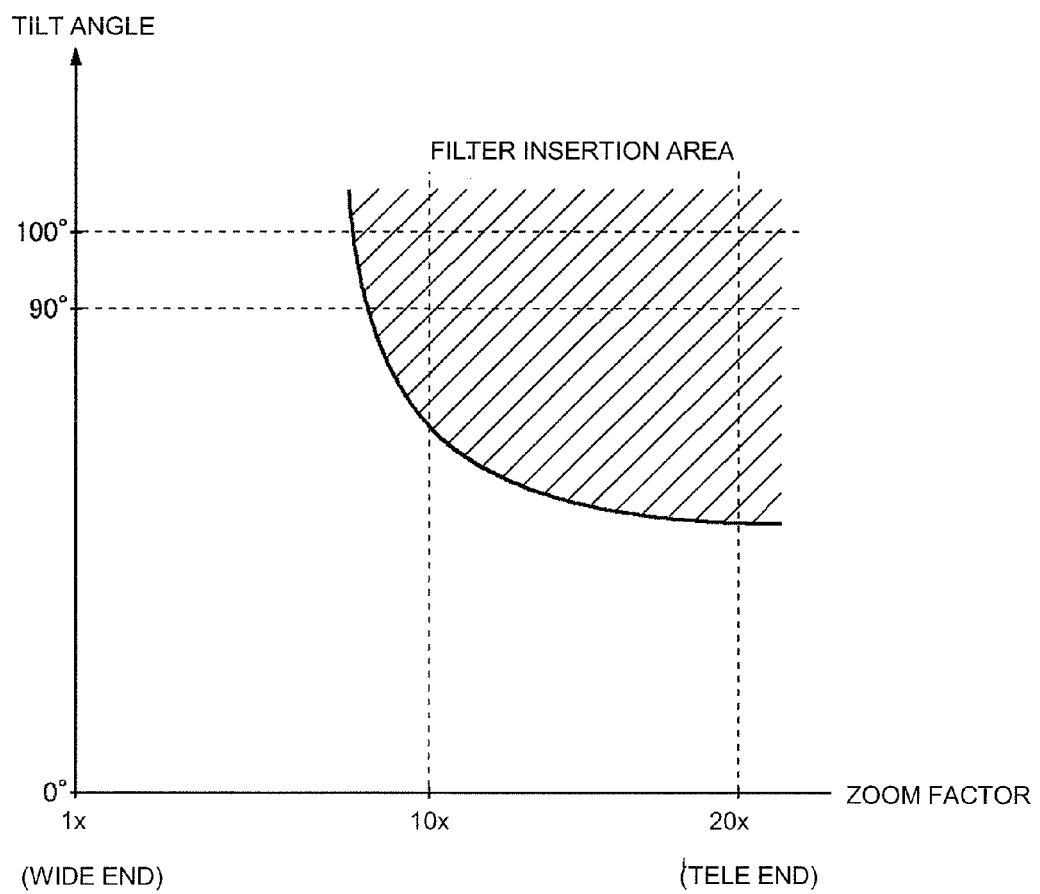
FIG. 9 is an explanatory diagram of a filter insertion area according to the first embodiment.

According to the present embodiment, insertion/non-insertion of a filter is dependent on the tilt angle and the zoom factor. FIG. 9 is a diagram schematically showing an area where the polarizing filter 6 is inserted (a filter insertion area). As shown in FIG. 9, in the present embodiment, the filter insertion area is determined by the zoom factor and the tilt angle.

According to the dome camera 1 of the first embodiment of the present invention as described above, both securing of a wide field of view and reduction in the image quality deterioration may be achieved in the case of capturing an image in a direction at a large tilt angle (a direction near the horizontal direction).

That is, in the present embodiment, the tilt rotation axis P2 of the camera lens 4 is more in the zenith direction than the center P1 of the dome cover 3, and thus, a wide field of view in the horizontal direction may be secured even when the tilt angle of the camera lens 4 is large. Also, in this case, when the tilt angle of the camera lens 4 becomes large, the polarizing filter 6 is inserted on the optical axis of the camera lens 4. This polarizing filter 6 allows deterioration of the image quality due to the offset of the camera lens 4 to be suppressed. Accordingly, both securing of a wide field of view and reduction in the image quality deterioration may be achieved in the case of capturing an image in a direction at a large tilt angle (a direction near the horizontal direction).

Furthermore, according to the present embodiment, when the zoom factor of the camera lens 4 is set on the TELE-end side, the polarizing filter 6 is inserted on the optical axis of the camera lens 4, and the image quality may be prevented, by the polarizing filter 6, from deteriorating due to the offset of the camera lens 4. Additionally, when the zoom factor of the camera lens 4 is set on the WIDE-end side, the image quality is not so deteriorated, and in this case, the polarizing filter 6 or the partially darkening filter 12 does not have to be inserted regardless of the tilt angle of the camera lens 4. Moreover, in the case a telephoto lens with a high zoom factor is attached, deterioration of the image quality may be suppressed by inserting the polarizing filter 6 or the partially darkening filter 12 even on the WIDE-end side.

Moreover, according to the present embodiment, the polarizing filter 6 is inserted in front of the camera lens 4, and light before entering the camera lens 4 is polarized by the polarizing lens. That is, light polarized by the polarizing lens enters the camera lens 4. Deterioration of the image quality due to the offset of the camera lens 4 may thereby be suppressed.

According to the modified example of the present embodiment (the modified example in FIG. 5), the partially darkening filter 12 is used instead of the polarizing filter 6, but the same effect as the present embodiment is also achieved by this modified example.

Moreover, according to this modified example, in the case of capturing an image in a direction at a large tilt angle (a direction near the horizontal direction), light is blocked by the blocking area 13 of the partially darkening filter 12 on half the range on the opposite side of the zenith direction of the dome cover 3 (the side of the larger tilt angle, the side nearer to the horizontal direction). The range where the light is blocked is assumed to correspond to a part where the molding precision of the dome cover 3 is not very high and which causes deterioration of the image quality. By blocking light at this part, deterioration of the image quality can be suppressed.

(Second Embodiment)

Next, a dome camera of a second embodiment of the present invention will be described. Here, description will be given focusing mainly on the difference of the dome camera of the second embodiment to the first embodiment. Unless specifically stated here, the configuration and the operation according to the present embodiment are the same as those of the first embodiment.

Figure 10:
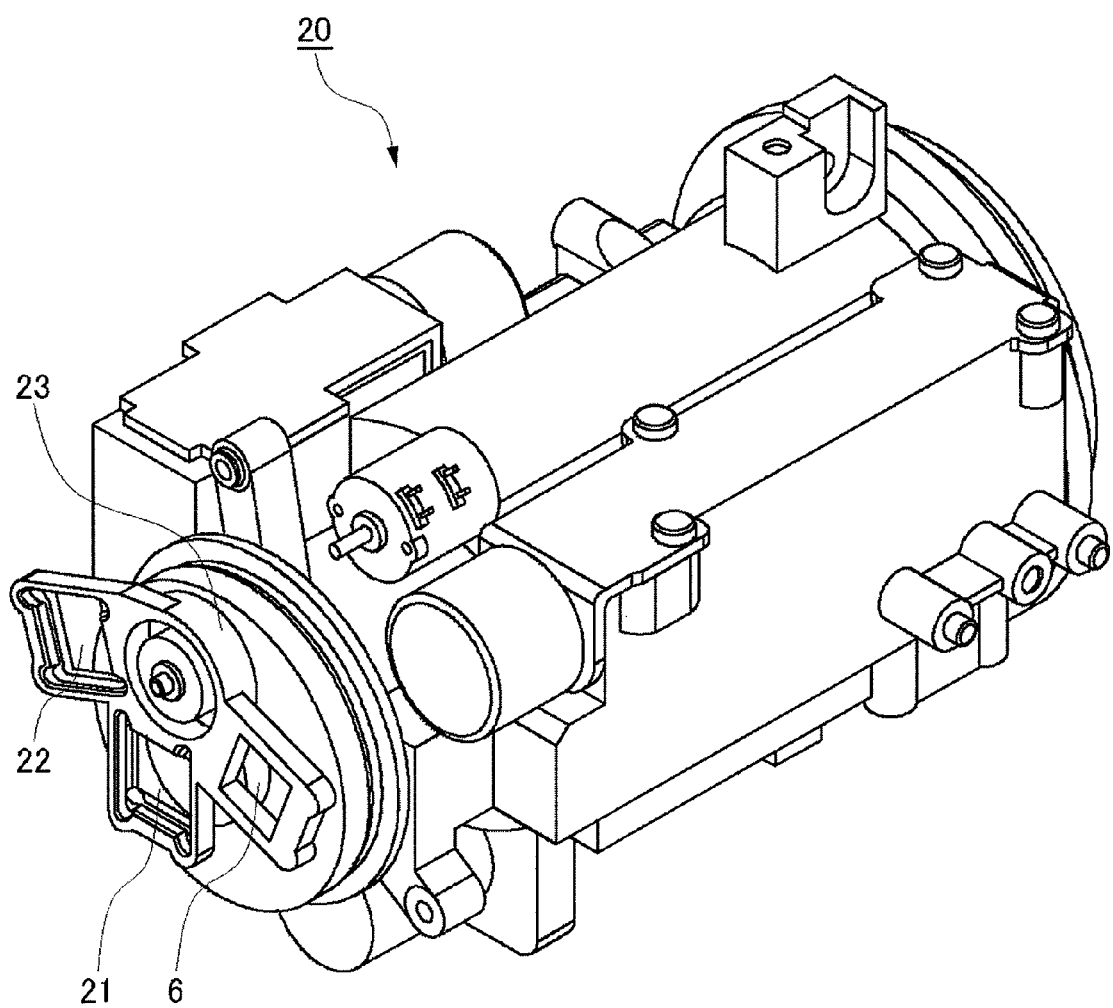
FIG. 10 is a perspective view of a camera unit according to a second embodiment.
Figure 11:
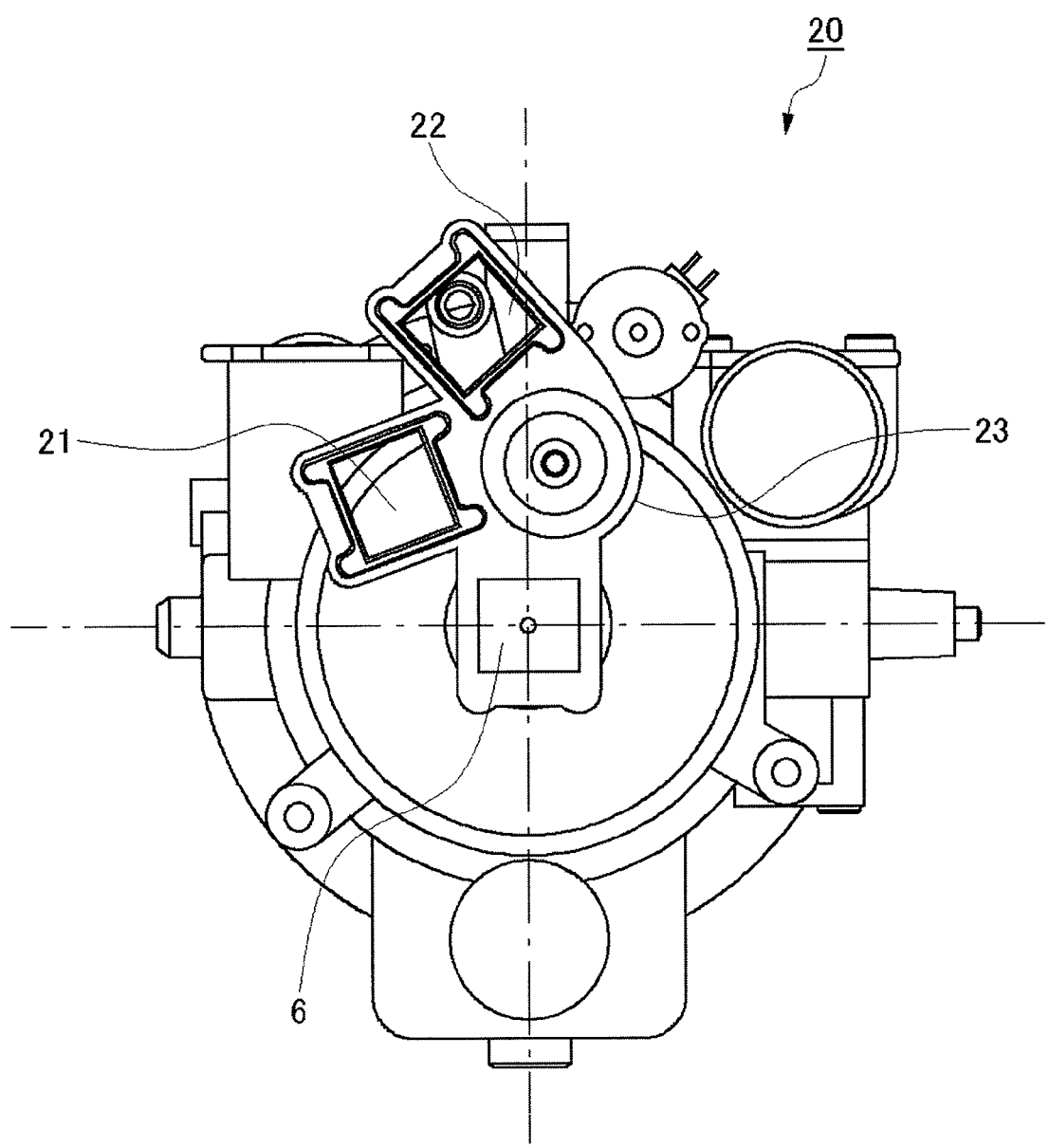
FIG. 11 is a front view of the camera unit according to the second embodiment (polarizing filter inserted position).
Figure 12:
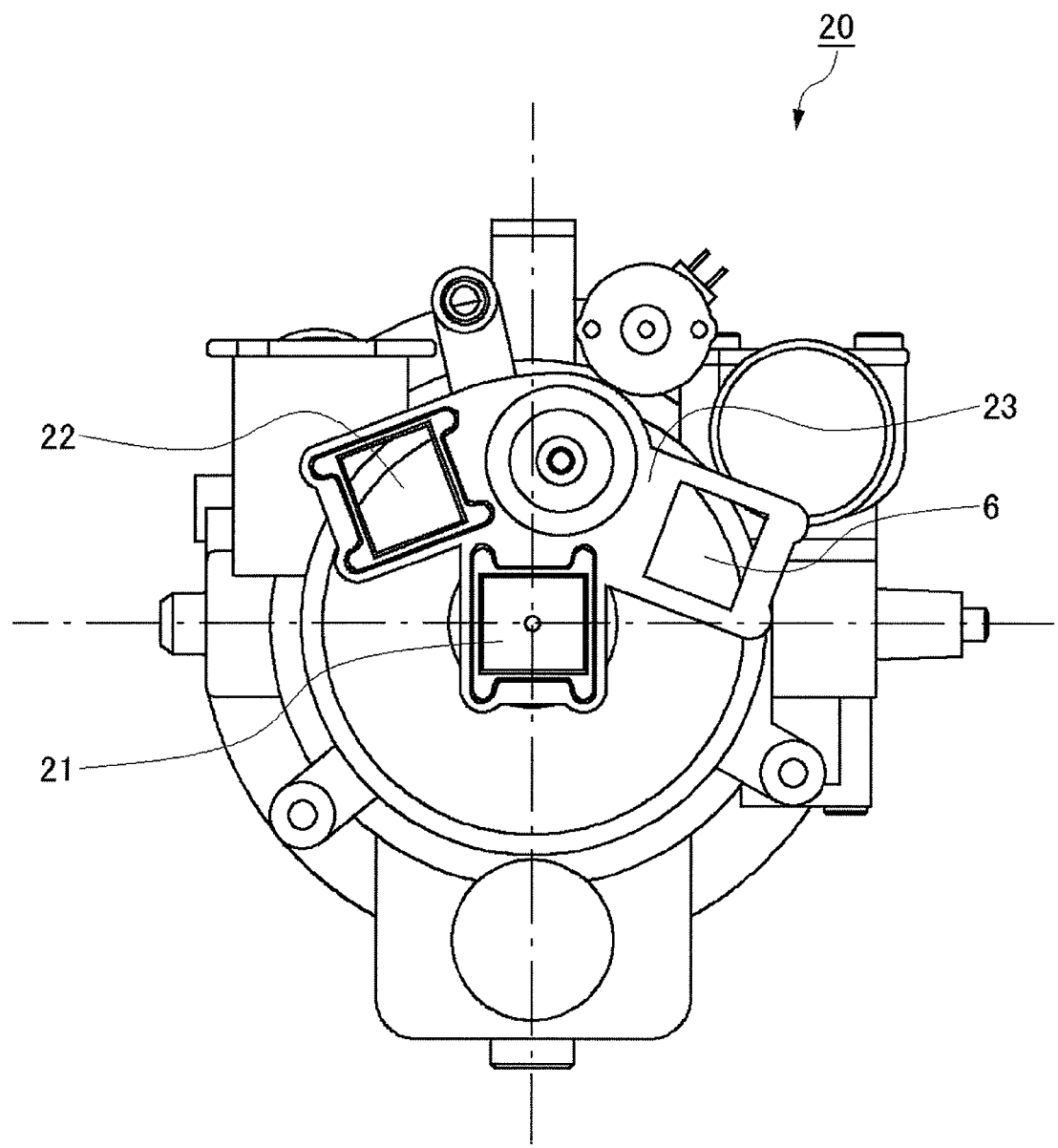
FIG. 12 is a front view of the camera unit according to the second embodiment (infrared cut filter inserted position).
Figure 13:
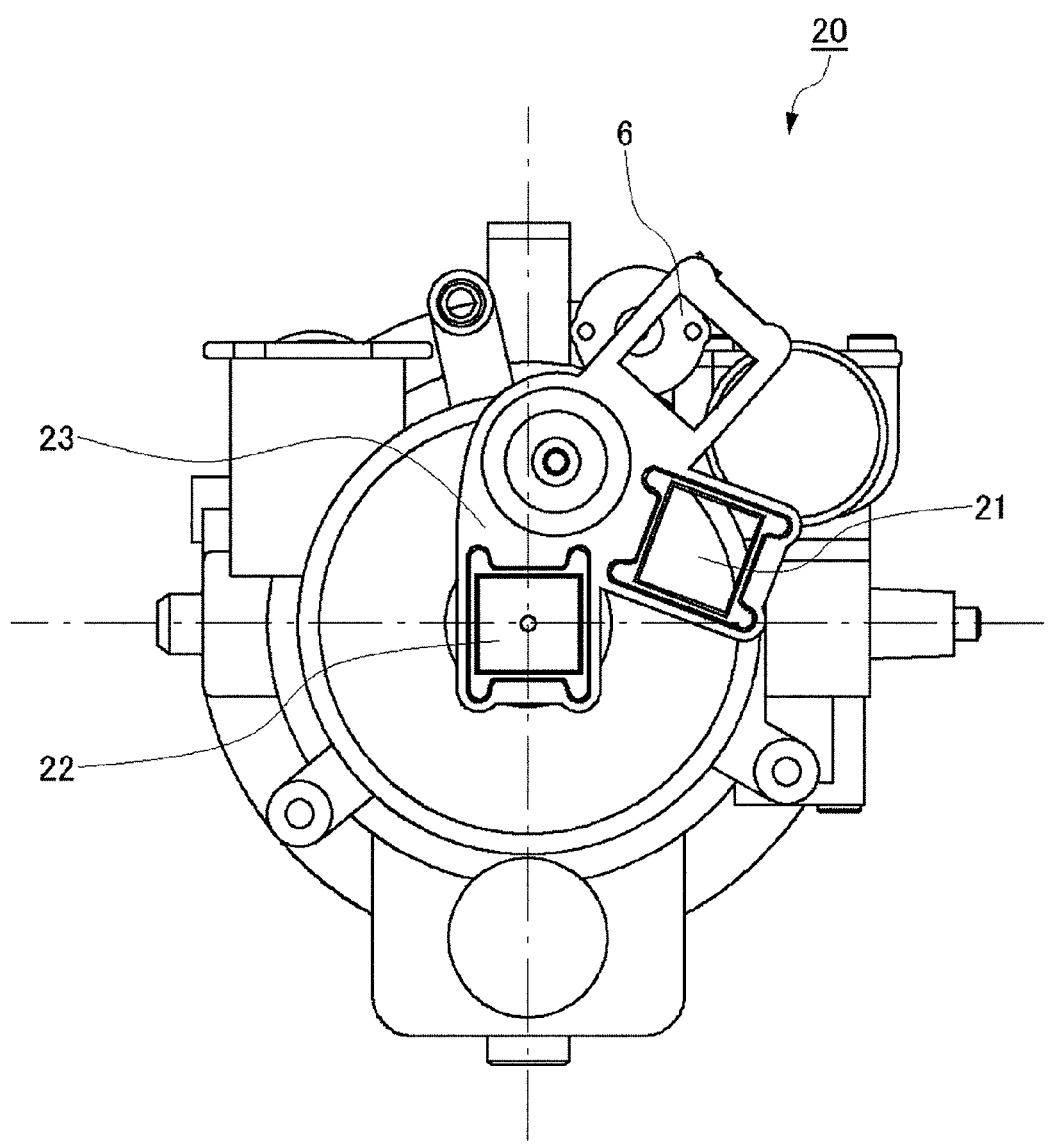
FIG. 13 is a front view of the camera unit according to the second embodiment (optical glass inserted position).

FIG. 10 is a perspective view of a camera unit of the dome camera of the present embodiment, and FIGS. 11 to 13 are front views of the camera unit. The camera unit is a unit that is provided inside a lens unit, and includes a switching mechanism for an infrared cut filter and an optical glass. The infrared cut filter is used when capturing an image in the daytime, and the optical glass is used when capturing an image at nighttime.

As shown in FIGS. 10 to 13, a camera unit 20 includes a filter frame 23 to which an infrared cut filter 21, an optical glass 22 and a polarizing filter 6 are attached. This filter frame 23 is enabled to rotate by the driving force of a motor. Three rotation positions (a polarizing filter inserted position, an infrared cut filter inserted position, and an optical glass inserted position) are set with respect to this filter frame 23.

When the rotation position of the filter frame 23 is the polarizing filter inserted position, the polarizing filter 6 is inserted in front of an image sensor (see FIG. 11). Also, when the rotation position of the filter frame 23 is the infrared cut filter inserted position, the infrared cut filter 21 is inserted in front of the image sensor (see FIG. 12). Furthermore, when the rotation position of the filter frame 23 is the optical glass inserted position, the optical glass 22 is inserted in front of the image sensor (see FIG. 13).

Figure 14:
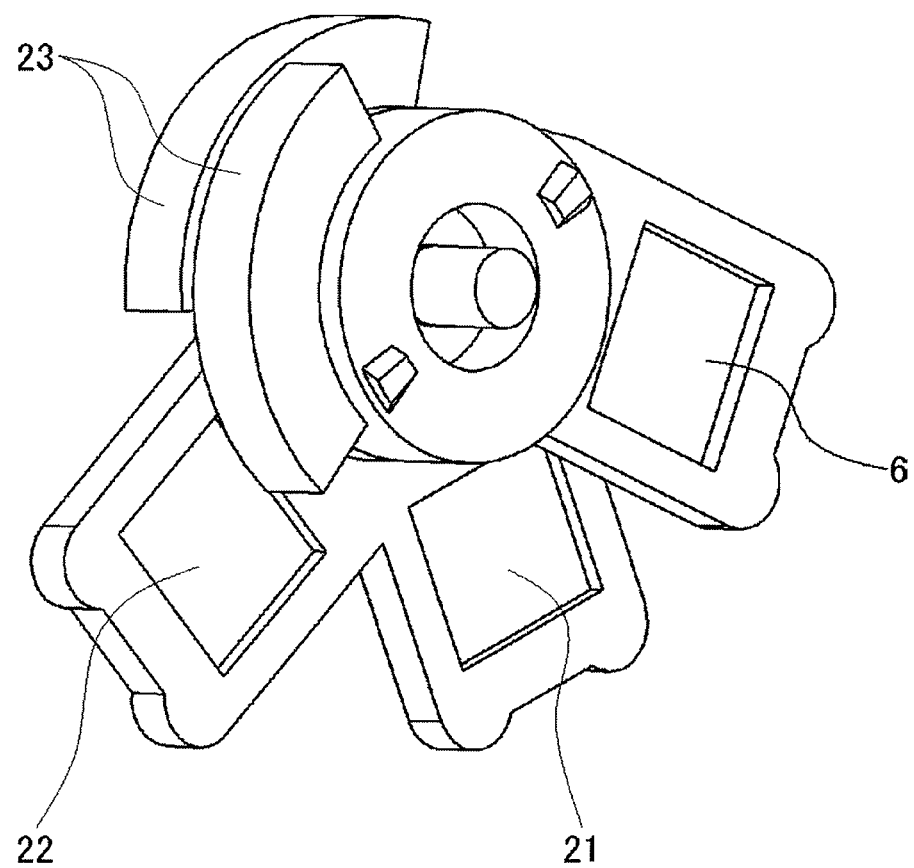
FIG. 14 is a perspective view of a filter switching mechanism according to a modified example of the second embodiment.
Figure 15:
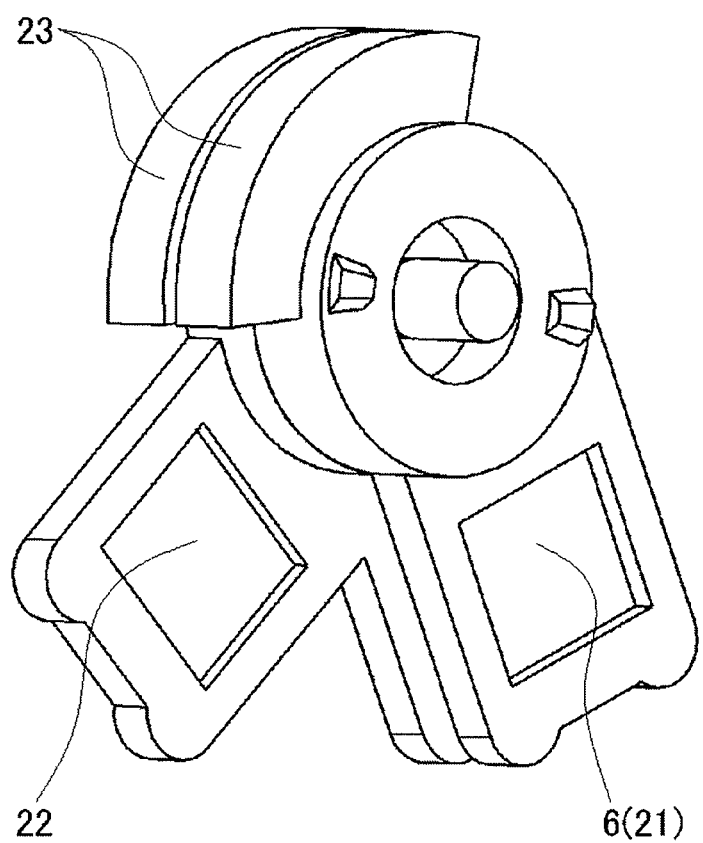
FIG. 15 is a perspective view of the filter switching mechanism according to the modified example of the second embodiment (at a time of polarizing filter insertion).

A modified example of the camera unit 20 of the second embodiment is shown in FIGS. 14 and 15. In this modified example, a polarizing filter 6, and an infrared cut filter 21 and an optical glass 22 are attached to separate filter frames 23, and are capable of rotating independently. In this case, it is possible to insert only the infrared cut filter 21 (or only the optical glass 22), as shown in FIG. 14, or it is possible to insert both the infrared cut filter 21 (or the optical glass 22) and the polarizing filter 6, as shown in FIG. 15.

Also with the dome camera 1 of the second embodiment of the present invention as described above, the same effect as the first embodiment is achieved.

Moreover, according to the present embodiment, the polarizing filter 6 may be inserted using the switching mechanism for the infrared cut filter 21 and the optical glass 22. By using a mechanism already provided (the switching mechanism for the infrared cut filter 21 and the optical glass 22), the number of parts may be reduced compared to a case of separately providing a dedicated mechanism, and the manufacturing cost may be reduced and miniaturization is enabled.

Heretofore, embodiments of the present invention have been illustrated and described, but the scope of the present invention is not limited by these, and various changes and modifications according to the object may be made within the scope described in the claims.

Preferred embodiments of the present invention that are currently conceivable have been described above, but it is to be understood that various modifications are possible with respect to the present embodiments, and every such modification within the true spirit and scope of the present invention is intended to be included in the appended claims.

Industrial Applicability

As described above, the dome camera according to the present invention achieves an effect that both securing of a wide field of view and reduction in the image quality deterioration are achieved in the case of capturing an image in a direction at a large tilt angle (a direction near the horizontal direction), and is useful as a surveillance camera or the like.

The invention claimed is:

1. A dome camera comprising:
   a spherical cover;
   a camera lens provided inside the spherical cover; and
   a darkening unit arranged between the spherical cover and the camera lens so as to partially block light entering the camera lens and to suppress image quality deterioration;
   wherein the camera lens includes a zoom function, and
   wherein, when a zoom factor of the camera lens is greater than a predetermined threshold factor, the darkening unit is inserted between the spherical cover and the camera lens.

2. The dome camera according to claim 1, wherein the darkening unit rotates such that an amount of light entering the camera lens is variable.

3. The dome camera according to claim 1, further comprising:
   a driver that moves the darkening unit to a position for suppressing image quality deterioration; and
   a controller that controls the driver.

4. The dome camera according to claim 1, wherein the darkening unit is retractable to a position where light entering the camera lens is not blocked.

5. The dome camera according to claim 1, wherein the camera lens is rotatable in a tilt direction.

6. The dome camera according to claim 5, wherein a tilt rotation axis of the camera lens is positioned more in a zenith direction than a spherical center position of the spherical cover.

7. The dome camera according to claim 5, wherein when a tilt angle of the camera lens exceeds a predetermined threshold angle, the darkening unit is inserted between the spherical cover and the camera lens.

8. The dome camera according to claim 1, wherein insertion of the darkening unit is controlled with a predetermined hysteresis band with respect to the zoom factor of the camera lens.

9. The dome camera according to claim 1, wherein the darkening unit is a polarizing filter or a darkening filter by which entering light is partially blocked.

10. The dome camera according to claim 9, wherein the polarizing filter is inserted in front of an image sensor using a switcher comprising an infrared cut filter and an optical glass.

11. A dome camera comprising:
    a spherical cover;
    a camera lens provided inside the spherical cover; and
    a darkening unit positioned between the spherical cover and the camera lens so as to partially block light entering the camera lens and to suppress image quality deterioration;
    wherein the camera lens is rotatable in a tilt direction and includes a zoom function, and
    wherein, when a tilt angle of the camera lens exceeds a predetermined threshold angle and a zoom factor of the camera lens is greater than a predetermined threshold factor, the darkening unit is inserted between the spherical cover and the camera lens.

12. The dome camera according to claim 11, wherein the darkening unit rotates such that an amount of light entering the camera lens is variable.

13. The dome camera according to claim 11, further comprising:
    a driver that moves the darkening unit to a position for suppressing image quality deterioration; and
    a controller that controls the driver.

14. The dome camera according to claim 11, wherein the darkening unit is retractable to a position where light entering the camera lens is not blocked.

15. The dome camera according to claim 11, wherein a tilt rotation axis of the camera lens is positioned more in a zenith direction than a spherical center position of the spherical cover.

16. The dome camera according to claim 11, wherein insertion of the darkening unit is controlled with a predetermined hysteresis band with respect to the zoom factor of the camera lens.

* * * * *